(12) United States Patent
Pizel et al.

(10) Patent No.: US 9,424,155 B1
(45) Date of Patent: Aug. 23, 2016

(54) USE EFFICIENCY OF PLATFORM MEMORY RESOURCES THROUGH FIRMWARE MANAGED I/O TRANSLATION TABLE PAGING

(71) Applicant: International Business Machines Corporation, Armonk, NY (US)

(72) Inventors: Travis Pizel, Rochester, MN (US); Naveen Rathi, Vikarabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/008,126

(22) Filed: Jan. 27, 2016

(51) Int. Cl.
G06F 11/00 (2006.01)
G06F 11/30 (2006.01)
G06F 9/50 (2006.01)
G06F 9/455 (2006.01)
G06F 3/06 (2006.01)

(52) U.S. Cl.
CPC .............. *G06F 11/301* (2013.01); *G06F 3/068* (2013.01); *G06F 3/0619* (2013.01); *G06F 3/0665* (2013.01); *G06F 9/45558* (2013.01); *G06F 9/5077* (2013.01); *G06F 2009/45579* (2013.01)

(58) Field of Classification Search
CPC ............ G06F 11/2082; G06F 11/2094; G06F 11/2025; G06F 11/2023; G06F 12/109; G06F 12/1027; G06F 12/1036; G06F 12/0712; G06F 12/145; G06F 9/45558; G06F 9/5077; G06F 9/45533
See application file for complete search history.

(56) References Cited

U.S. PATENT DOCUMENTS

| | | | |
|---|---|---|---|
| 4,763,250 A | 8/1988 | Keshlear et al. | |
| 5,479,627 A | 12/1995 | Khalidi et al. | |
| 6,654,866 B2 | 11/2003 | Hagersten et al. | |
| 6,877,158 B1 * | 4/2005 | Arndt .................. | G06F 12/0284 711/202 |
| 7,159,095 B2 | 1/2007 | Dale et al. | |
| 7,721,068 B2 | 5/2010 | Lowe et al. | |
| 7,752,417 B2 * | 7/2010 | Manczak ............ | G06F 11/3466 711/209 |
| 7,783,858 B2 | 8/2010 | Chiang et al. | |
| 8,301,863 B2 * | 10/2012 | Hall ..................... | G06F 12/1036 711/202 |
| 9,092,351 B2 | 7/2015 | Greiner et al. | |
| 9,201,677 B2 * | 12/2015 | Joshi ................... | G06F 9/45558 |
| 2002/0169936 A1 | 11/2002 | Murphy | |
| 2014/0129797 A1 | 5/2014 | Arndt et al. | |
| 2015/0370592 A1 * | 12/2015 | Tuch ................... | G06F 9/45558 718/1 |
| 2016/0062787 A1 * | 3/2016 | Joshi ................... | G06F 9/45558 718/1 |

FOREIGN PATENT DOCUMENTS

EP 533190 B1 4/1996

* cited by examiner

*Primary Examiner* — Nadeem Iqbal
(74) *Attorney, Agent, or Firm* — Patterson + Sheridan, LLP

(57) ABSTRACT

Techniques are disclosed herein for paging I/O translation table entries. A host bridge of system hardware receives a request to fetch a first segment of an I/O translation table associated with one of a plurality of logical partitions executing in a computing system. The host bridge identifies a control register associated with the first segment. The control register includes a time base and an indication of whether the first segment is paged out to a storage volume. Upon determining that the first segment is paged out to the storage volume, a second segment is paged out from a location in memory to the storage volume. The first segment is paged in to the location.

20 Claims, 5 Drawing Sheets

USE EFFICIENCY OF PLATFORM MEMORY RESOURCES THROUGH FIRMWARE MANAGED I/O TRANSLATION TABLE PAGING

BACKGROUND

Embodiments presented herein generally relate to computer systems, and more specifically, to paging I/O translation table entries.

Generally, computing systems rely on I/O translation tables to provide a mapping of a specified virtual I/O address to a physical memory address in a range of addresses that a given I/O device may access. During a direct memory address (DMA) read or write operation, the I/O translation table maps a segment to an address in physical memory, e.g., using a Translation Control Entry (TCE) table in an I/O memory management unit (IOMMU). A computing system may provide an I/O translation table for each I/O device to improve DMA operations, prevent conflicting memory accesses by logical partitions that share the memory, and translate from an address in a peripheral bus (e.g., a PCI bus) to a memory address.

Further, a computing system may be configured to provide hardware virtualization. For instance, the computing system may spawn, via a hypervisor, multiple logical partitions, where each logical partition serves as a distinct virtual computing system that shares physical hardware resources (e.g., processing, storage capacity, etc.) with other logical partitions. A client operating system (OS) executing in a logical partition typically must communicate with the hypervisor to associate an entry in the I/O translation table of a device with an address of a page of memory assigned to the logical partition. As the bandwidth supported by I/O devices increases, larger I/O translation tables are needed to avoid the client OS from having to frequently interface with the hypervisor to configure the I/O translation table entries. However, increased sizes in I/O translation tables result in increased consumption of system resources, such as memory—which leads to the hypervisor having fewer resources to assign to logical partitions in the computer system. Further, because I/O operations are typically performed in bursts, large portions of I/O translation table may be unused during a number of periods, resulting in less than optimal resource usage.

SUMMARY

One embodiment presented herein discloses a method. The method generally includes receiving a request to fetch a first segment of an I/O translation table associated with one of a plurality of logical partitions executing in a computing system. The method also includes identifying a control register associated with the first segment. The control register includes a time base and an indication of whether the first segment is paged out to a storage volume. Upon determining that the first segment is paged out to the storage volume, (i) a second segment is paged out from a location in memory to the storage volume, and (ii) the first segment is paged in to the location.

Another embodiment presented herein discloses a computer program product. The computer program product includes a non-transitory computer-readable storage medium having instructions, which, when executed on a processor, performs an operation. The operation itself includes receiving a request to fetch a first segment of an I/O translation table associated with one of a plurality of logical partitions executing in a computing system. The operation also includes identifying a control register associated with the first segment. The control register includes a time base and an indication of whether the first segment is paged out to a storage volume. Upon determining that the first segment is paged out to the storage volume, (i) a second segment is paged out from a location in memory to the storage volume, and (ii) the first segment is paged in to the location.

Yet another embodiment presented herein discloses a system having a processor and a memory. The memory stores code, which, when executed on the processor, performs an operation. The operation itself includes receiving a request to fetch a first segment of an I/O translation table associated with one of a plurality of logical partitions executing in a computing system. The operation also includes identifying a control register associated with the first segment. The control register includes a time base and an indication of whether the first segment is paged out to a storage volume. Upon determining that the first segment is paged out to the storage volume, (i) a second segment is paged out from a location in memory to the storage volume, and (ii) the first segment is paged in to the location.

BRIEF DESCRIPTION OF THE SEVERAL VIEWS OF THE DRAWINGS

So that the manner in which the above-recited aspects are attained and can be understood in detail, a more particular description of embodiments of the present disclosure, briefly summarized above, may be had by reference to the appended drawings. Note, however, that the appended drawings illustrate only typical embodiments of this present disclosure and are therefore not considered limiting of its scope, for the present disclosure may admit to other equally effective embodiments.

DETAILED DESCRIPTION

Figure 1:
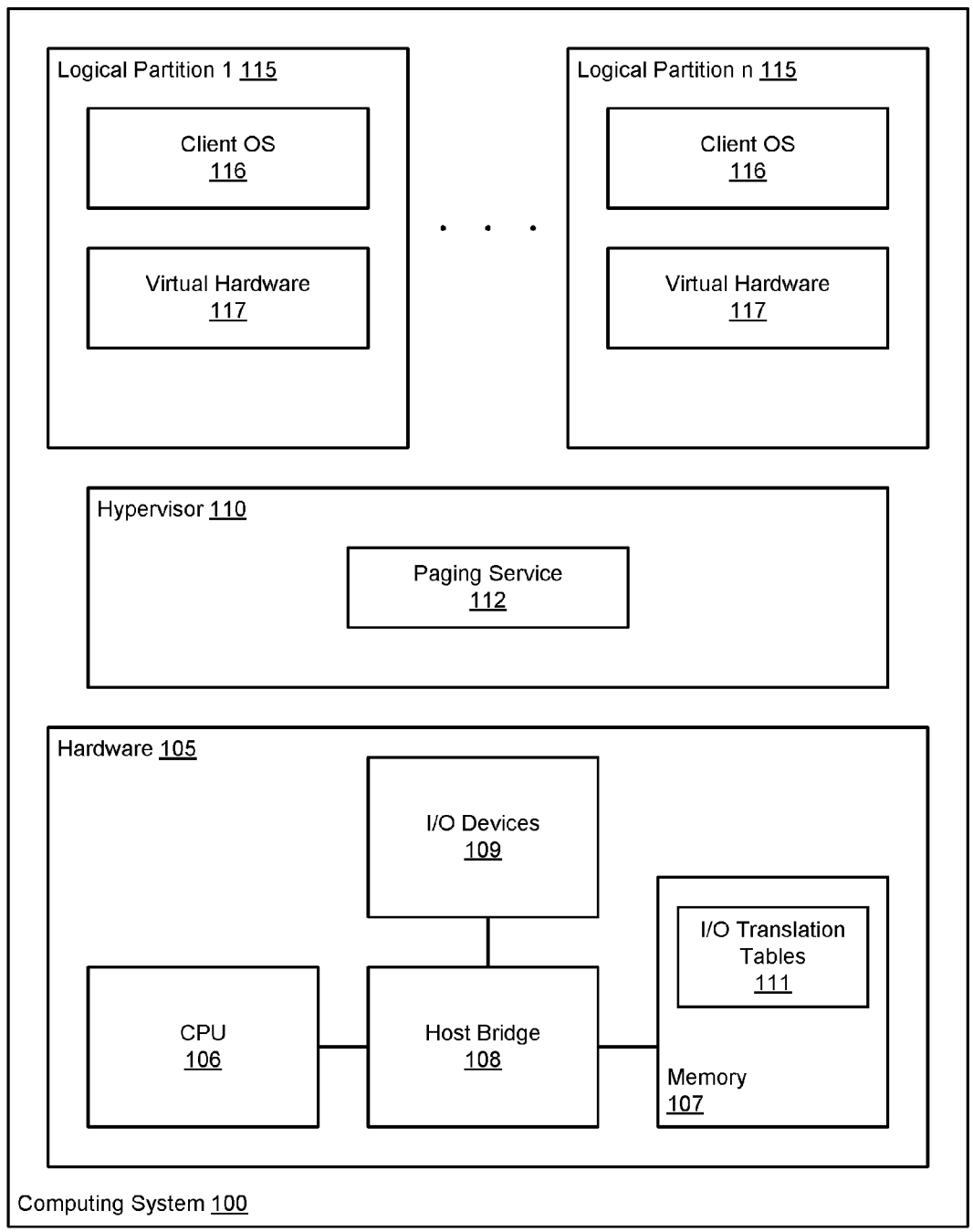
FIG. 1 illustrates an example computing system configured to page entries in and out of an I/O translation table, according to one embodiment.

Embodiments presented herein disclose techniques for providing on-demand paging of I/O translation table entries. In one embodiment, a computing system allocates an I/O translation table for each connected I/O device (e.g., storage devices, network adapters, etc.). Further, a hypervisor in the computing system includes a service that pages segments of an I/O translation table out to a paging device (e.g., a storage volume) owned by the hypervisor. The service may page in an I/O translation table segment from the paging device when the corresponding I/O device attempts to access the I/O translation table. Doing so allows the hypervisor to assign I/O translation tables to a given device without needing to consume a large amount of system memory (unless the I/O traffic reaches a level that requires a significant portion of the I/O translation table be paged in).

In one embodiment, the hypervisor associates each I/O translation table segment with a base address register in a configuration space of the I/O device. The base address register points to a virtual memory address location of the associated I/O translation table segment. Further, the hypervisor associates the base address register with a control register that provides information regarding the underlying I/O translation table segment. In particular, the control register may include an availability bit that indicates whether the I/O translation segment is currently paged in. If an I/O translation segment is currently paged in, then the segment may be accessed in a DMA operation. Further, the control register may include a time base indicating when the I/O translation table segment was last fetched.

In the event a device driver of a given client operating system (OS) attempts to perform an I/O operation for an I/O device on a given address, a peripheral host bridge in the computer system (e.g., a PCI host bridge) attempts a fetch of a corresponding I/O translation table segment. The PCI host bridge may determine, based on the availability bit of the control register associated with the segment, whether the I/O translation table segment is currently paged in. If so, then the PCI host bridge fetches the I/O translation segment from memory, which allows the device driver to proceed with the I/O operation. Otherwise, if the I/O translation table segment is currently paged out to the paging device, the PCI host bridge generates a fault interrupt and stalls the I/O operation until the fault interrupt is satisfied.

When the PCI host bridge generates the fault interrupt, the paging service may identify an I/O translation table segment that is currently paged into memory but has not been used for a specified amount of time. To do so, the paging service may evaluate the time base value in a control register of each paged-in I/O translation table segment to determine whether the elapsed time exceeds a threshold. If the paging service identifies such an I/O translation table segment, the paging service pages out that I/O translation table segment from its memory location and then pages in the I/O translation table segment associated with the fault interrupt in that location. Doing so allows the host bridge to resume the previously stalled I/O operation.

Advantageously, by paging out I/O translation table segments that are not recently used (or less frequently used) to a paging device and by paging in the segments as needed, the hypervisor can maintain relatively small I/O translation tables for each I/O device. As a result, the hypervisor may allocate more memory resources towards logical partitions in the system. Further, even if the I/O translation tables are relatively small, because the I/O translation table segments are paged in on an on-demand basis, a client operating system (OS) does not need to interface with the hypervisor as frequently to re-set I/O translation table segments, resulting in further efficiency.

FIG. 1 illustrates an example computing system 100 configured to page entries in and out of an I/O translation table, according to one embodiment. As shown, the computing system 100 includes hardware 105, a hypervisor 110, and one or more logical partitions 1-$n$ 115. The computing system 100 is representative of a physical computing platform that hosts multiple logical partitions 1-$n$ that may be owned by independent entities that share physical resources with one another, i.e., the hardware 105. Of course, the computing system 100 may include a number of additional components, and the components described relative to FIG. 1 are presented for explanatory purposes.

As shown, the hardware 105 includes a CPU 106, a memory 107, a host bridge 108, and multiple I/O devices 109. The CPU 106 is representative of a single CPU, multiple CPUs, a single CPU having multiple processing cores, and the like. Similarly, memory 107 may be a random access memory. While the memory 107 is shown as a single identity, it should be understood that the memory 107 may comprise a plurality of modules, and that the memory 107 may exist at multiple levels, from high speed registers and caches to lower speed but larger DRAM chips.

In one embodiment, the host bridge 108 interconnects peripheral devices (e.g., the I/O devices 109) with the CPU 106 and the memory 107. For instance, the host bridge 108 allows the CPU 106 and the I/O devices 109 to access the memory 107. Further, the host bridge 108 provides data access mappings between the CPU 106 and the I/O devices 109. Further still, the host bridge 108 may provide the hypervisor 110 access to a configuration space of the I/O devices 109.

Each logical partition 115 uses a subset of the resources provided by the hardware 105 and is virtualized as a distinct computing instance that has its own hardware (virtual hardware 117) and executes a client operating system (OS) 116. For each logical partition 115, the hypervisor 110 manages the corresponding virtual hardware 117 that includes emulated hardware, such as a CPU and memory.

In one embodiment, the memory 107 includes one or more I/O translation tables 111. The hypervisor 110 maintains memory allocations of an I/O translation table 111 for each I/O device 109. An I/O translation table 111 provides a range of memory addresses that the I/O device 109 is allowed to access. A size of the I/O translation table 111 can vary. For instance, some I/O translation tables 111 may be relatively small (e.g., 4 MB), whereas others can be larger (e.g., 2 GB). The hypervisor 110 may map a segment of the I/O translation table segment to the memory 107.

In one embodiment, the client OS 116 of a given logical partition 115 performs a series of interface calls to the hypervisor 110 to associate a given I/O translation segment with an address in the memory 107 assigned to the logical partition 115. Thereafter, the client OS 116 may request a given I/O device to perform an I/O operation to a location in the memory 107. To do so, the client OS 116 may send an I/O translation token to the physical I/O device 109 associated with the corresponding I/O translation table segment. The host bridge 108 then evaluates the I/O translation table segment to validate that the underlying physical memory address is actually associated with the logical partition 115 (e.g., and not associated with another logical partition 115 or is otherwise unauthorized for the logical partition 115 to access).

As stated above, an I/O translation table 111 can have a relatively large size, e.g., for the purpose of reducing the amount of times that the client OS 116 needs to interface with the hypervisor 110 to set segments of the I/O translation table 111. However, a drawback to setting the size of an I/O translation table 111 to be relatively large is sacrifices in performance efficiency. For instance, I/O traffic is generally performed in bursts, so segments of an I/O translation table 111 can be infrequently accessed (and thus, memory resources that could be assigned to logical partitions 115 is wasted).

To address this issue, in one embodiment, the I/O translation tables 111 are configured to be a relatively small size in the memory 107. Further, the hypervisor 110 includes a paging service 112 that is configured to page unused (and not recently used) segments of each I/O translation table 111 out to a paging device (e.g., a physical storage device or logical storage volume associated with the logical partition) maintained by the hypervisor 110. As further described below, the paging service 112 may page the segments back into the I/O translation table in memory 107 on an on-demand basis.

In one embodiment, the hypervisor 110 configures a register structure in configuration space for a given I/O device 109. The register structure includes base address registers that point to segments in the I/O translation table 111 associated with the device 109. Further, each base address register may be associated with a control register that provides information for the corresponding segment of the I/O translation table 111. For example, the control register may provide a time base of the last fetch of the segment. The control register may also provide an indicator of whether the segment is currently paged out to the paging device.

In one embodiment, during initialization of the computing system 100, the paging service 112 may determine which segments of a given I/O translation table 111 to page out from memory of a logical partition 115 to a paging device. For instance, the paging service 112 may page out segments from the second half of memory allocated to logical partition 115. When a device driver of a given I/O device 109 requests to perform a DMA action on a given location in memory 107, the device driver sends an I/O translation token to the PCI host bridge 108. In turn, the host bridge 108 determines whether the corresponding I/O translation table 111 segment is currently paged in or out. For instance, if the segment is currently paged in, the PCI host bridge processes the request normally. On the other hand, if the segment is currently paged out, the PCI host bridge may generate a fault interrupt. This process is further described below.

Figure 2:
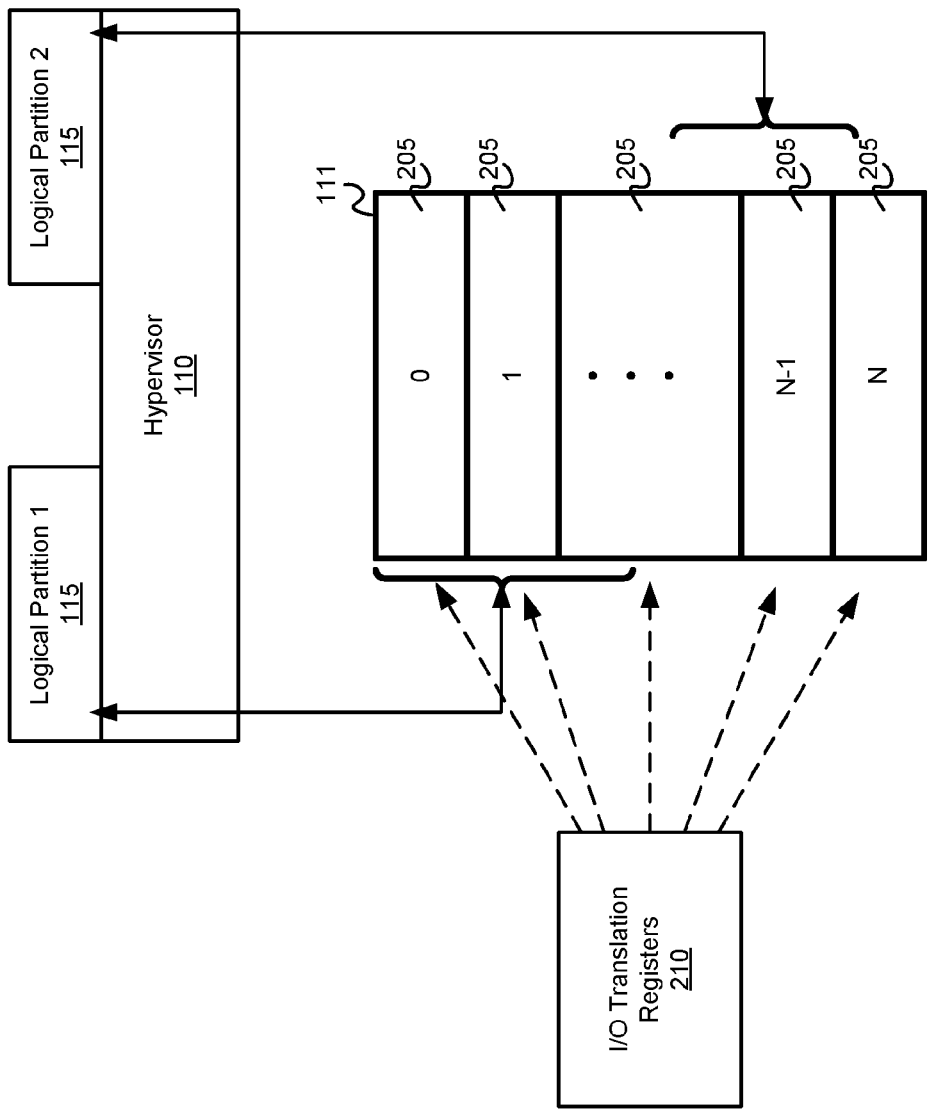
FIG. 2 illustrates an abstraction of an I/O translation table, according to one embodiment.

FIG. 2 illustrates an abstraction of an example I/O translation table 111, according to one embodiment. Illustratively, FIG. 2 depicts an example I/O translation table 111 of a given I/O device 109, having block segments 205 0-N. The paging service 112 may page each of the block segments 205 0-N in or out, based on demand for a given segment 205. Illustratively, various block segments 205 may be assigned to each of the logical partitions 115.

For example, FIG. 2 depicts a number of block segments 205 as assigned to logical partition 1 115, and a number of block segments 205 as assigned to logical partition 2 115. The data paths between logical partition 1 115 and the assigned block segments 205 illustrates that the logical partition 1 115 can only access the assigned block segments 205 of the I/O translation table 111 to store, retrieve, or change data. Similarly, the data paths between logical partition 2 115 and the assigned block segments 205 illustrates that the logical partition 2 115 can only access the assigned block segments 205 of the I/O translation table 111 to store, retrieve, or change data.

Further, I/O translation registers 210 may point to each block segment 205, as indicated by the dotted lines pointing to segments of the I/O translation table 111. As further described below, a given I/O translation register 210 may contain information about its associated block segment 205, e.g., whether the block segment 205 is currently paged out, when the block segment 205 was last accessed, etc.

Figure 3:
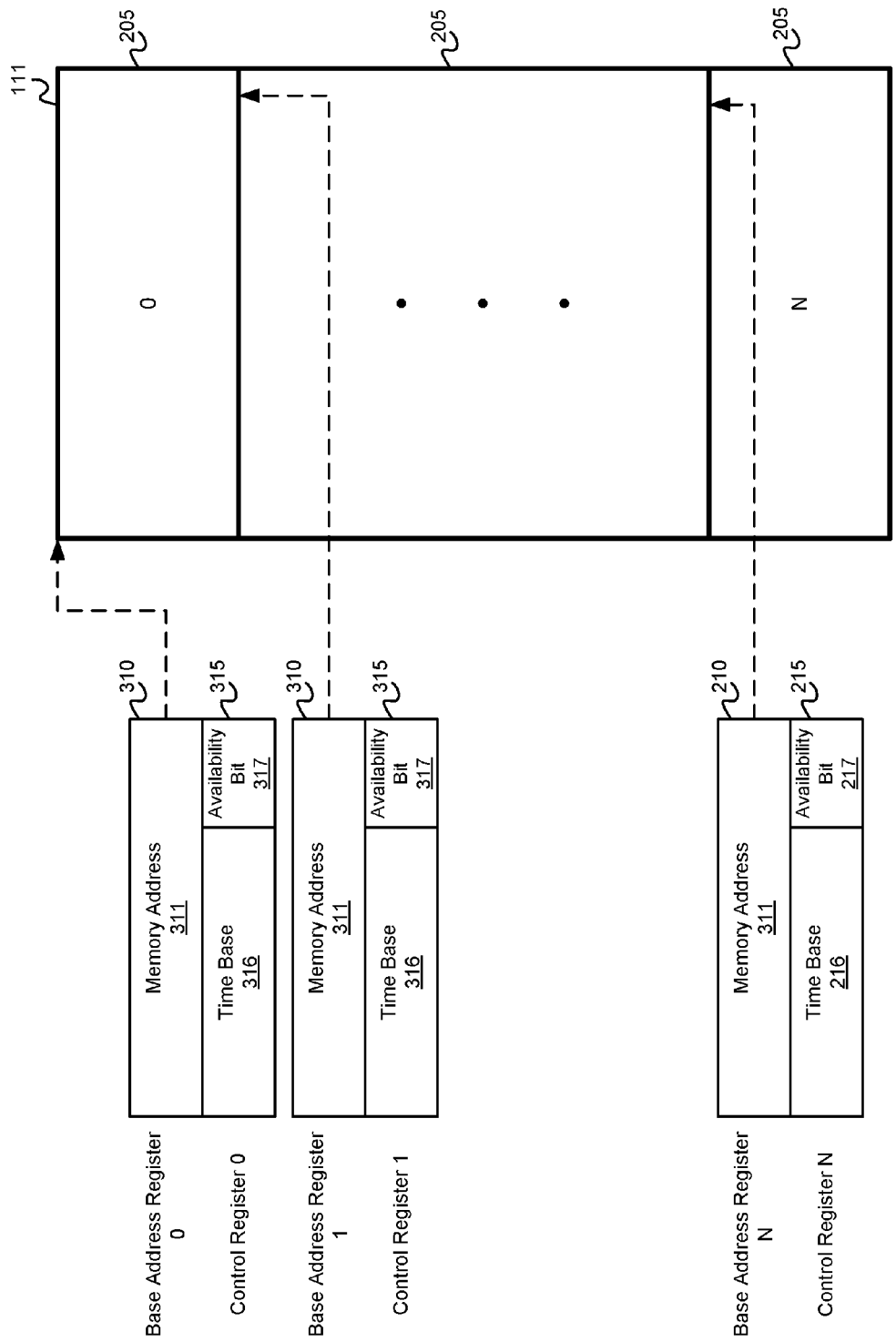
FIG. 3 illustrates an example register structure for I/O translation table entries, according to one embodiment.

FIG. 3 illustrates an example register structure for I/O translation table segments, according to one embodiment. Illustratively, each segment is associated with both a base address register 310 and a control register 315. As stated, the hypervisor 110 may configure a configuration space for the I/O device 109 such that the base address registers 310 and control registers 315 each correspond to a given segment 205, where each base address register 310 and control register 315 provides information for a given segment 205.

In one embodiment, a base address register 310 points to a particular block segment 205 of an associated I/O translation table 111. In particular, a base address register 310 includes a memory address 311, which indicates a starting location of a corresponding block segment 205 (as represented by the dotted arrow pointing to a given bold line). Further, a control register 315 includes a time base 316 and an availability bit 317.

In one embodiment, the time base 216 indicates the time of the most recent instance where the host bridge 108 fetched the associated segment 205. A fault interrupt handler in the paging service 112 may evaluate the time base 216 to determine whether the corresponding segment 205 has been paged in memory 107 for over a specified threshold amount of time. If so, the paging service 112 might page out the segment 205 to the paging device, as part of the fault interrupt handling process.

In one embodiment, the availability bit 317 indicates whether the associated segment 205 is currently paged in to memory 107. For example, if a given availability bit 317 is set, the associated segment 205 is currently paged in the memory 107. An I/O device 109 that requests access to the associated segment 205 can perform an I/O operation using the segment 205 as normal. Otherwise, an availability bit 317 that is not set indicates that the associated segment 205 is currently paged out. If paged out, the host bridge 108 may generate a page fault that is to be handled by the hypervisor 110. The hypervisor 110 may identify an available location in memory to page in the requested segment 205.

Figure 4:
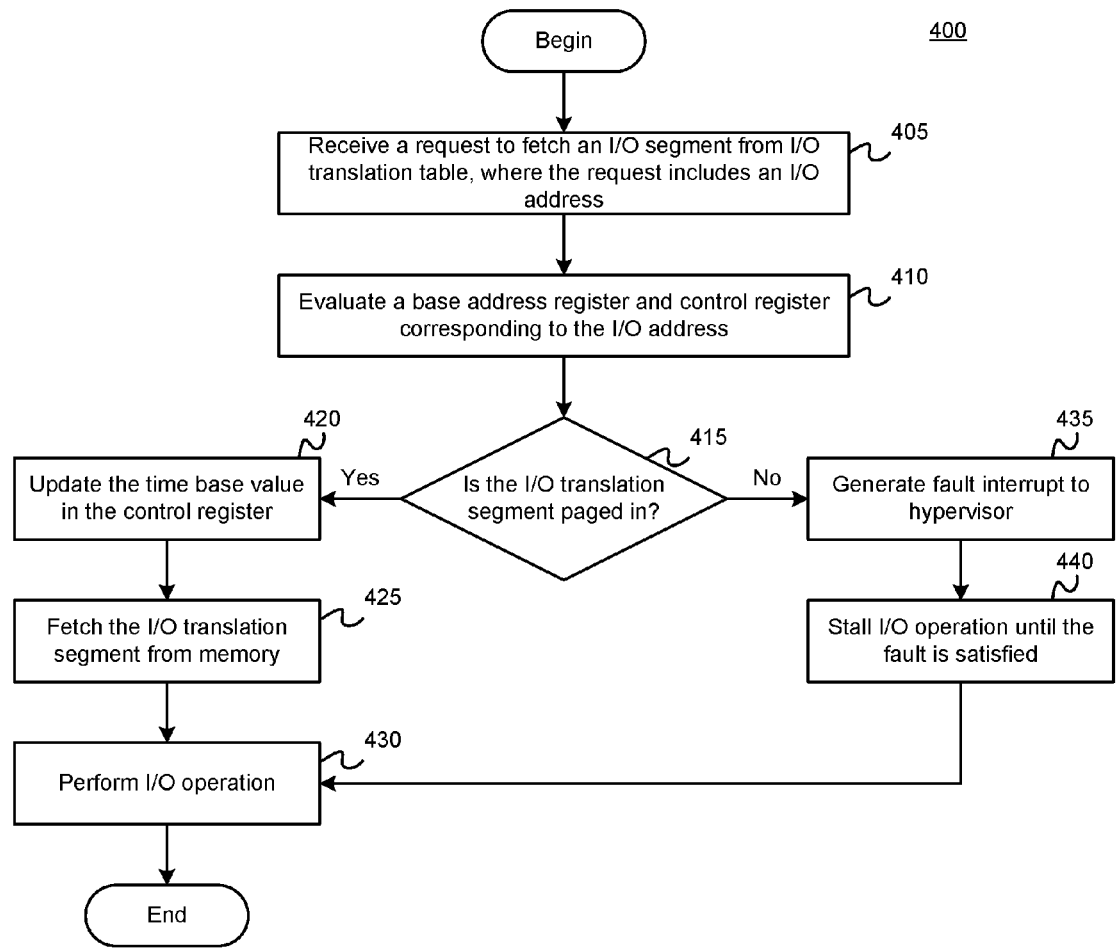
FIG. 4 illustrates a method for translating an I/O address via the I/O translation table, according to one embodiment.

FIG. 4 illustrates a method 400 for translating an I/O address via the I/O translation table, according to one embodiment. As shown, method 400 begins at step 405, where the host bridge 108 receives a request to fetch a segment from a given I/O translation table from a device driver associated with a given I/O device 109. For instance, the device driver may send the request when performing an I/O operation on a location in memory 107. The request may be in the form of a token that indicates a memory address pointing to the I/O translation table segment.

At step 410, the host bridge 108 identifies the base address register and control register associated with the I/O translation table segment using the specified memory address. As stated, the control register associated with the I/O translation table provides an availability bit that allows the host bridge 108 to determine whether the segment is currently paged in, and not currently maintained in a paging device. For instance, the availability bit is set if the segment is currently paged in.

At step 415, the host bridge 108 determines whether the I/O translation segment is paged in, based on the evaluation of the base address register and the control register associated with the segment. The segment being paged in indicates that the host bridge 108 can proceed with translating the segment to the mapped physical memory address (because the segment is not paged out to the paging device). If so, then the host bridge 108 updates the time base value in the control register (at step 420). Further, at step 425, the host bridge 108 fetches the I/O translation segment from memory. Doing so allows the host bridge 108 to determine the mapping between the I/O translation segment and the physical memory address to be used in the I/O operation. At step 430, the host bridge 108 proceeds with the I/O operation.

However, if the I/O translation segment is currently paged out to a paging device associated with the logical partition, the host bridge 108 generates a fault interrupt for the hypervisor 110 to process. This interrupt handling process is further described relative to FIG. 5. At step 440, the host bridge 108 stalls the I/O operation until the fault is handled. For instance, the host bridge 108 may stall until the paging service 112 has paged out an I/O translation table segment that has not been recently accessed and pages in the requested segment into the memory space of the paged out segment. Once the fault is satisfied, the host bridge 108 performs the I/O operation (at step 430).

Figure 5:
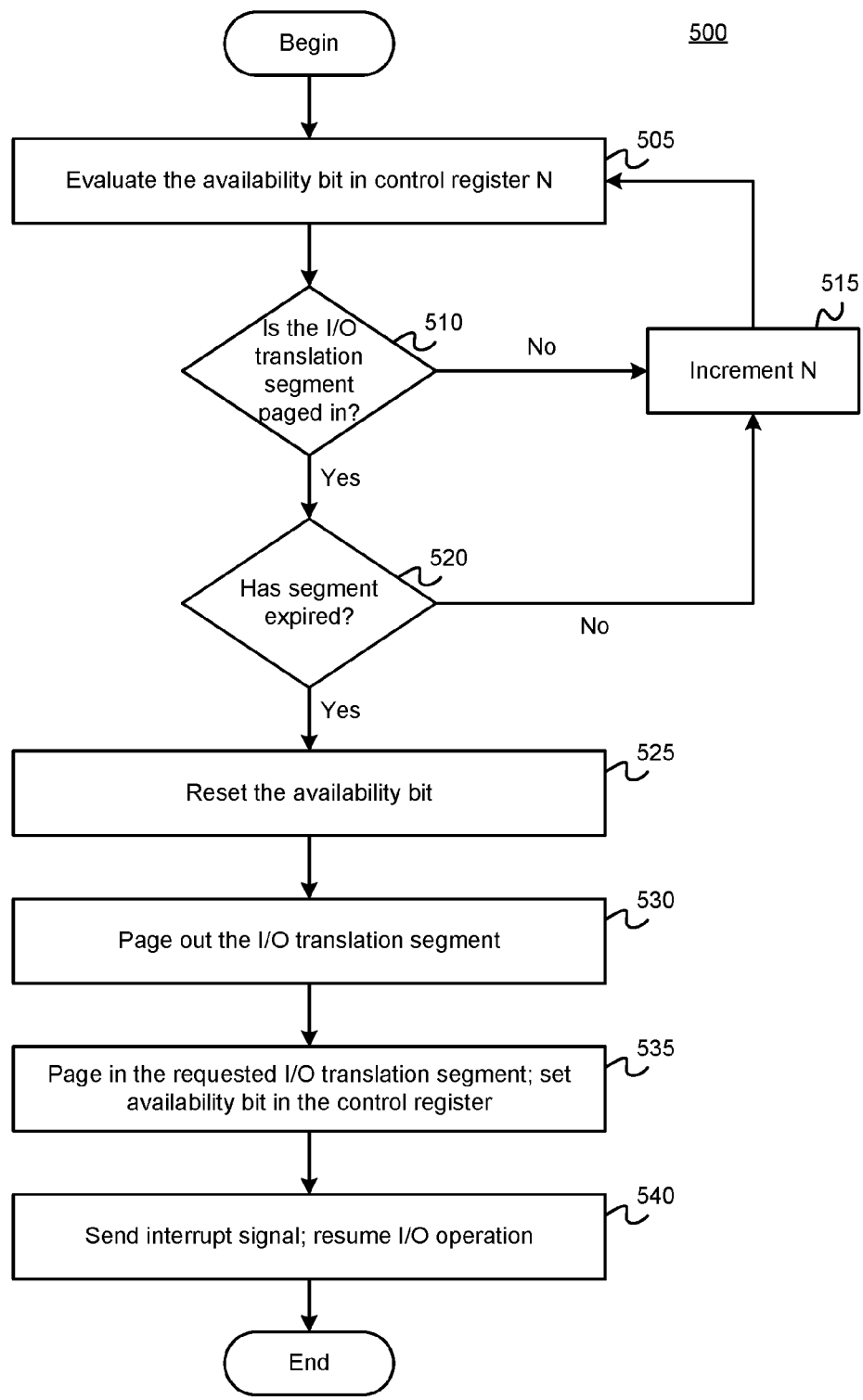
FIG. 5 illustrates a method for processing a fault interrupt during I/O address translation, according to one embodiment.

FIG. 5 illustrates a method 500 for processing a fault interrupt during I/O address translation, according to one embodiment. More specifically, method 500 describes the process that occurs after the host bridge 108 generates an I/O translation fault interrupt. At step 405, the paging service 112 evaluates the availability bit of a control register at a given index value N. At step 510, the paging service 112 determines, based on the availability bit, whether the I/O translation table segment is currently paged in. If not, the paging service 112 increments the index N (at step 515), which allows the host bridge 108 to evaluate availability bit of the next control register (at step 505). That is, the paging service 112 continues to iterate through the control registers.

If the I/O translation table segment is paged in, then at step 520, the paging service 112 may determine whether the I/O translation table segment is expired. For example, the paging service 112 can evaluate, using the time base value in the control register, whether the time that has elapsed since the last access of that segment exceeds a specified threshold. If not, then that I/O translation segment remains paged in, and the method 500 returns to step 515, where the paging service 112 increments N and evaluates the availability bit in the next control register.

If the segment is expired, then at step 525, the paging service 112 resets the availability bit of that control register to mark that I/O translation segment as unavailable. At step 530, the paging service 112 pages out the I/O translation segment to the paging device associated with the logical partition. At step 535, the paging service 112 then retrieves the requested I/O translation table segment from the paging device. The paging service 112 then associates the retrieved segment with the memory space of the now-paged out segment. Further, the paging service 112 sets the availability bit of the retrieved segment to indicate that the retrieved segment is now paged in. At step 540, the paging service 112 sends an end-of-interrupt signal to the host bridge 108. In turn, the host bridge 108 receives the signal and retries the I/O operation that had been stalled due to the fault interrupt.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding discussion, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments presented herein may be adapted as part of a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments presented herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   receiving a request to fetch a first segment of an I/O translation table associated with one of a plurality of logical partitions executing in a computing system;
   identifying a control register associated with the first segment, wherein the control register includes a time base and an indication of whether the first segment is paged out to a storage volume; and
   upon determining that the first segment is paged out to the storage volume, (i) paging out a second segment from a location in memory to the storage volume and (ii) paging the first segment in to the location.

2. The method of claim 1, further comprising, upon determining that the first segment is paged in:
   updating the time base; and
   fetching the first I/O translation segment.

3. The method of claim 1, wherein the storage volume is maintained by a hypervisor executing in the computing system.

4. The method of claim 1, further comprising, prior to paging out the second segment:
   generating a fault interrupt directed to a hypervisor executing in the computing system; and
   stalling an I/O operation associated with the request to fetch the first segment of the I/O translation table.

5. The method of claim 4, wherein the fault interrupt is satisfied after paging the first segment in to the location.

6. The method of claim 5, further comprising:
   resuming the I/O operation after the fault interrupt is satisfied.

7. The method of claim 1, wherein the indication of whether the first segment is paged out to the paging device is a bit in the control register that is set when the first segment is paged in.

8. A computer program product, comprising:
   a non-transitory computer-readable storage medium having instructions, which, when executed on a processor, perform an operation comprising:
      receiving a request to fetch a first segment of an I/O translation table associated with one of a plurality of logical partitions executing in a computing system,
      identifying a control register associated with the first segment, wherein the control register includes a time base and an indication of whether the first segment is paged out to a storage volume, and
      upon determining that the first segment is paged out to the storage volume, (i) paging out a second segment from a location in memory to the storage volume and (ii) paging the first segment in to the location.

9. The computer program product of claim 8, wherein the operation further comprises, upon determining that the first segment is paged in:
   updating the time base; and
   fetching the first I/O translation segment.

10. The computer program product of claim 8, wherein the storage volume is maintained by a hypervisor executing in the computing system.

11. The computer program product of claim 8, wherein the operation further comprises,
   prior to paging out the second segment:
   generating a fault interrupt directed to a hypervisor executing in the computing system; and
   stalling an I/O operation associated with the request to fetch the first segment of the I/O translation table.

12. The computer program product of claim 11, wherein the fault interrupt is satisfied after paging the first segment in to the location.

13. The computer program product of claim 12, wherein the operation further comprises:
   resuming the I/O operation after the fault interrupt is satisfied.

14. The computer program product of claim 8, wherein the indication of whether the first segment is paged out to the paging device is a bit in the control register that is set when the first segment is paged in.

15. A system, comprising:
   a processor; and
   a memory storing code, which, when executed on the processor, performs an operation, comprising:
      receiving a request to fetch a first segment of an I/O translation table associated with one of a plurality of logical partitions executing in a computing system,
      identifying a control register associated with the first segment, wherein the control register includes a time base and an indication of whether the first segment is paged out to a storage volume, and
      upon determining that the first segment is paged out to the storage volume, (i) paging out a second segment from a location in memory to the storage volume and (ii) paging the first segment in to the location.

16. The system of claim 15, wherein the operation further comprises, upon determining that the first segment is paged in:
   updating the time base; and
   fetching the first I/O translation segment.

17. The system of claim 15, wherein the storage volume is maintained by a hypervisor executing in the computing system.

18. The system of claim 15, wherein the operation further comprises, prior to paging out the second segment:
   generating a fault interrupt directed to a hypervisor executing in the computing system; and
   stalling an I/O operation associated with the request to fetch the first segment of the I/O translation table.

19. The system of claim 18, wherein the fault interrupt is satisfied after paging the first segment in to the location.

20. The system of claim 19, wherein the operation further comprises:
   resuming the I/O operation after the fault interrupt is satisfied.

* * * * *